(12) United States Patent
Luo et al.

(10) Patent No.: US 9,556,562 B2
(45) Date of Patent: Jan. 31, 2017

(54) COMPOSITIONS USED IN PAPER AND METHODS OF MAKING PAPER

(71) Applicant: Kemira Oyj, Helsinki (FI)

(72) Inventors: Yuping Luo, Duluth, GA (US); Scott Rosencrance, Douglasville, GA (US)

(73) Assignee: KEMIRA OYJ, Helsinki (FI)

( * ) Notice: Subject to any disclaimer, the term of this patent is extended or adjusted under 35 U.S.C. 154(b) by 456 days.

(21) Appl. No.: 14/097,483

(22) Filed: Dec. 5, 2013

(65) Prior Publication Data

US 2014/0158316 A1 Jun. 12, 2014

Related U.S. Application Data

(60) Provisional application No. 61/734,073, filed on Dec. 6, 2012.

(51) Int. Cl.

| | | |
|---|---|---|
| D21H 17/03 | (2006.01) | |
| D21H 17/43 | (2006.01) | |
| D21H 17/55 | (2006.01) | |
| D21H 17/63 | (2006.01) | |
| D21H 21/18 | (2006.01) | |
| C08G 69/26 | (2006.01) | |
| D21H 17/00 | (2006.01) | |
| C08G 73/02 | (2006.01) | |
| D21H 17/37 | (2006.01) | |
| D21H 17/14 | (2006.01) | |
| D21H 17/15 | (2006.01) | |
| D21H 17/42 | (2006.01) | |
| D21H 17/54 | (2006.01) | |
| D21H 17/56 | (2006.01) | |
| D21H 17/66 | (2006.01) | |
| D21H 21/20 | (2006.01) | |

(52) U.S. Cl.
CPC ............ D21H 17/72 (2013.01); C08G 73/028 (2013.01); C08G 73/0286 (2013.01); D21H 17/14 (2013.01); D21H 17/15 (2013.01); D21H 17/37 (2013.01); D21H 17/375 (2013.01); D21H 17/42 (2013.01); D21H 17/54 (2013.01); D21H 17/55 (2013.01); D21H 17/56 (2013.01); D21H 17/66 (2013.01); D21H 17/71 (2013.01); D21H 17/74 (2013.01); D21H 21/20 (2013.01)

(58) Field of Classification Search
USPC ............... 162/158, 164.1, 164.3, 164.6, 166, 162/168.1–168.3, 181.1–181.3, 183, 185
See application file for complete search history.

(56) References Cited

U.S. PATENT DOCUMENTS

| | | | | |
|---|---|---|---|---|
| 3,197,427 | A | | 7/1965 | Schmalz |
| 3,332,834 | A | * | 7/1967 | Reynolds, Jr. ........ D21H 17/375 162/158 |
| 6,294,645 | B1 | * | 9/2001 | Allen .................... C08G 73/028 523/414 |
| 6,359,040 | B1 | † | 3/2002 | Burdick |
| 6,376,578 | B1 | † | 4/2002 | Gorzynski |
| 6,723,204 | B2 | | 4/2004 | Van Handel et al. |
| 6,939,443 | B2 | † | 9/2005 | Ryan |
| 7,081,512 | B2 | * | 7/2006 | Riehle ................. C08G 73/0286 162/164.3 |
| 7,141,181 | B2 | * | 11/2006 | Mori ...................... B01D 21/01 162/168.2 |
| 7,868,071 | B2 | * | 1/2011 | Luo ....................... C08K 5/0091 524/210 |
| 7,897,013 | B2 | * | 3/2011 | Hagiopol ............... C08F 220/56 162/158 |
| 2009/0165978 | A1 | | 7/2009 | Hagiopol et al. |

FOREIGN PATENT DOCUMENTS

| | | |
|---|---|---|
| EP | 1918455 | 7/2008 |
| WO | WO9905361 | 2/1999 |
| WO | WO0009806 | 2/2000 |

OTHER PUBLICATIONS

Table of Acids with Ka and pKa values, University of California Santa Barbara, no date, [online], retrieved from the Internet, [retrieved Mar. 3, 2016, <URL: http://clas.sa.ucsb.edu/staff/Resource%20folder/Chem109ABC/Acid,%20Bas%20Strength/Table%20of%20Acids%20w%20Kas%20and%20pKas.pdf>.*
Smook, Gary A., Handbook for Pulp and Paper Technologists, 2nd ed, Angus Wilde Publications, 1992, pp. 220.*
Smook, Gary A., Handbook of Pulp and Paper Terminology, Angus Wilde Publications, 1990, p. 51.*
International Search Report; Application No. PCT/IB2013/002916; Applicant—Kemira OYJ; dated Apr. 10, 2014; 4 pages.

\* cited by examiner
† cited by third party

*Primary Examiner* — Dennis Cordray
(74) *Attorney, Agent, or Firm* — Thomas Horstemeyer, LLP

(57) ABSTRACT

Compositions that can be used in a paper material, which may include an anionic polymer, a polyamidoamine epihalohydrin resin, and a stabilizer, are disclosed. Methods for adding the compositions to a paper material are also disclosed.

19 Claims, No Drawings

COMPOSITIONS USED IN PAPER AND METHODS OF MAKING PAPER

CROSS-REFERENCE TO RELATED APPLICATION

This application claims priority to U.S. provisional application entitled "COMPOSITIONS USED IN PAPER AND METHODS OF MAKING PAPER," having Ser. No. 61/734,073, filed on Dec. 6, 2012, which is entirely incorporated herein by reference.

BACKGROUND

1. Field of the Art

The present embodiments relate to compositions used in paper and paper making.

2. Description of Related Art

Paper is sheet material containing interconnected small, discrete fibers. The fibers are usually formed into a sheet on a fine screen from a dilute water suspension or slurry. Paper typically is made from cellulose fibers, although occasionally synthetic fibers are used. Paper products made from untreated cellulose fibers lose their strength rapidly when they become wet, i.e., they have very little wet strength. Cationic polyamidoamine-epichlorohydrin (PAE) resins can be added to increase the wet strength of the paper. However, there is a limit to how much cationic PAE resin is absorbed onto the pulp.

The description herein of certain advantages and disadvantages of known methods and compositions is not intended to limit the scope of the present disclosure. Indeed the present embodiments may include some or all of the features described above without suffering from the same disadvantages.

SUMMARY

In view of the foregoing, one or more embodiments include compositions that can be used in a paper material, a method for adding the compositions to a paper material, and the like.

At least one embodiment provides a composition including an anionic polymer, a polyamidoamine epihalohydrin resin, and a stabilizer that includes a multivalent cation and a weak acid.

At least one embodiment provides a method of making a paper that includes introducing to an aqueous pulp slurry a composition that includes an anionic polymer, a polyamidoamine epihalohydrin resin, and a stabilizer including a multivalent cation and a weak acid.

DETAILED DESCRIPTION OF THE EMBODIMENTS

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, synthetic organic chemistry, paper chemistry, and the like, which are within the skill of the art. Such techniques are explained fully in the literature.

The examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms and phrases that shall be defined to have the following meanings unless a contrary intention is apparent.

Definitions

The term "substituted" refers to any one or more hydrogens on the designated atom or in a compound that can be replaced with a selection from the indicated group, provided that the designated atom's normal valence is not exceeded, and that the substitution results in a stable compound.

"Acrylamide monomer" refers to a monomer of formula: $H_2C=C(R_1)C(O)NHR_2$, wherein $R_1$ is H or $C_1$-$C_4$ alkyl and $R_2$ is H, $C_1$-$C_4$ alkyl, aryl or arylalkyl. Exemplary acrylamide monomers include acrylamide and methacrylamide.

"Acrylic monomer" refers to a monomer of formula: $H_2C=C(R_1)C(O)OR_2$, wherein $R_1$ is H or $C_1$-$C_4$ alkyl and $R_2$ is H, $C_1$-$C_4$ alkyl, aryl or arylalkyl. Exemplary acrylic monomers include acrylate and methyl acrylate monomers.

"Aldehyde" refers to a compound containing one or more aldehyde (—CHO) groups, where the aldehyde groups are capable of reacting with the amino or amido groups of a polymer comprising amino or amido groups as described herein. Exemplary aldehydes can include formaldehyde, paraformaldehyde, glutaraldehyde, glyoxal, and the like.

"Aliphatic group" refers to a saturated or unsaturated, linear or branched hydrocarbon group and encompasses alkyl, alkenyl, and alkynyl groups, for example.

"Alkyl" refers to a monovalent group derived from a straight or branched chain saturated hydrocarbon by the removal of a single hydrogen atom. Exemplary alkyl groups include methyl, ethyl, n- and iso-propyl, cetyl, and the like.

"Alkylene" refers to a divalent group derived from a straight or branched chain saturated hydrocarbon by the removal of two hydrogen atoms. Exemplary alkylene groups include methylene, ethylene, propylene, and the like.

"Amido group" or "amide" refer to a group of formula —C(O)NHY$_1$ where Y$_1$ is selected from H, alkyl, alkylene, aryl and arylalkyl.

"Amino group" or "amine" refer to a group of formula —NHY$_2$ where Y$_2$ is selected from H, alkyl, alkylene, aryl, and arylalkyl.

"Aryl" refers to an aromatic monocyclic or multicyclic ring system of about 6 to about 10 carbon atoms. The aryl is optionally substituted with one or more $C_1$-$C_{20}$ alkyl, alkylene, alkoxy, or haloalkyl groups. Exemplary aryl groups include phenyl or naphthyl, or substituted phenyl or substituted naphthyl.

"Arylalkyl" refers to an aryl-alkylene-group, where aryl and alkylene are defined herein. Exemplary arylalkyl groups include benzyl, phenylethyl, phenylpropyl, 1-naphthylmethyl, and the like.

"Alkoxy" refers to an alkyl group as defined above with the indicated number of carbon atoms attached through an oxygen bridge. Exemplary alkoxy groups include methoxy, ethoxy, n-propoxy, i-propoxy, n-butoxy, s-butoxy, t-butoxy, n-pentoxy, and s-pentoxy.

"Halogen" refers to fluorine, chlorine, bromine, or iodine.

"Dicarboxylic acid compounds" includes organic aliphatic and aromatic (aryl) dicarboxylic acids and their corresponding acid chlorides, anhydrides and esters, and mixtures thereof. Exemplary dicarboxylic acid compounds include maleic acid, succinic acid, glutaric acid, adipic acid, pimelic acid, suberic acid, azelaic acid, sebasic acid, phthalic acid, isophthalic acid, terephthalic acid, naphthalenedicarboxylic acid, dimethyl maleate, dimethyl malonate, diethyl malonate, dimethyl succinate, di-isopropyl succinate, dimethyl glutarate, diethyl glutarate, dimethyl adipate, methyl ethyl adipate, dimethyl sebacate, dimethyl phthalate, dimethyl isophthalate, dimethyl terephthalate, dimethyl naphthalenedicarboxylate, dibasic esters (DBE), poly(ethylene glycol) bis(carboxymethyl)ether, succinyl chloride, glutaryl dichloride, adipoyl chloride, sebacoyl chloride, sebacate, phthaloyl chloride, isophthaloyl chloride, terephthaloyl chloride, naphthalenedicarboxylate, maleic anhydride, succinic anhydride, glutaric anhydride, phthalic anhydride, 1,8-naphthalic anhydride, and the like.

"Polyalkylene polyamines" can include polyamines such as polyethylene polyamine, polypropylene polyamine, and polyoxybutylene polyamine. In an embodiment, "polyalkylene polyamine" refers to those organic compounds having two primary amine (—NH$_2$) groups and at least one secondary amine group where the amino nitrogen atoms are linked together by alkylene groups, provided no two nitrogen atoms are attached to the same carbon atoms. Exemplary polyalkylene polyamines include diethylenetriamine (DETA), triethylenetetraamine (TETA), tetraethylenepentaamine (TEPA), dipropylenetriamine, and the like.

"Polyamidoamine" refers to a condensation product of one or more of the polycarboxylic acids and/or a polycarboxylic acid derivative with one or more of a polyalkylene polyamine.

"Paper strength" means a property of a paper material, and can be expressed, inter alia, in terms of dry strength and/or wet strength. Dry strength is the tensile strength exhibited by the dry paper sheet, typically conditioned under uniform humidity and room temperature conditions prior to testing. Wet strength is the tensile strength exhibited by a paper sheet that has been wetted with water prior to testing.

As used herein, the terms "paper" or "paper product" (these two terms are used interchangeably) is understood to include a sheet material that contains paper fibers, and may also contain other materials. Suitable paper fibers include natural and synthetic fibers, for example, cellulosic fibers, wood fibers of all varieties used in papermaking, other plant fibers, such as cotton fibers, fibers derived from recycled paper; and the synthetic fibers, such as rayon, nylon, fiberglass, or polyolefin fibers. The paper product may be composed only of natural fibers, only of synthetic fibers, or a mixture of natural fibers and synthetic fibers. For instance, in the preparation of a paper product a paper web or paper material may be reinforced with synthetic fibers, such as nylon or fiberglass. A paper product may be or impregnated with nonfibrous materials, such as plastics, polymers, resins, or lotions. As used herein, the terms "paper web" and "web" are understood to include both forming and formed paper sheet materials, papers, and paper materials containing paper fibers. A paper product may be a coated, laminated, or composite paper material. A paper product can be bleached or unbleached.

Paper can include, but is not limited to, writing papers and printing papers (e.g., uncoated mechanical, total coated paper, coated free sheet, coated mechanical, uncoated free sheet, and the like), industrial papers, tissue papers of all varieties, paperboards, cardboards, packaging papers (e.g., unbleached kraft paper, bleached kraft paper), wrapping papers, paper adhesive tapes, paper bags, paper cloths, toweling, wallpapers, carpet backings, paper filters, paper mats, decorative papers, disposable linens and garments, and the like.

Paper can include tissue paper products. Tissue paper products include sanitary tissues, household tissues, industrial tissues, facial tissues, cosmetic tissues, soft tissues, absorbent tissues, medicated tissues, toilet papers, paper towels, paper napkins, paper cloths, paper linens, and the like. Common paper products include printing grade (e.g., newsprint, catalog, rotogravure, publication, banknote, document, bible, bond, ledger, stationery), industrial grade (e.g., bag, linerboard, corrugating medium, construction paper, greaseproof, glassine), and tissue grade (e.g., sanitary, toweling, condenser, wrapping).

A tissue paper may be a feltpressed tissue paper, a pattern densified tissue paper, or a high bulk, uncompacted tissue paper. A tissue paper may be characterized as: creped or uncreped; of a homogeneous or multilayered construction; layered or non-layered (blended); and/or one-ply, two-ply, or three or more plies. Tissue paper may include soft and absorbent paper tissue products such as consumer tissue products.

Paperboard is thicker, heavier, and less flexible than conventional paper. Many hardwood and softwood tree species are used to produce paper pulp by mechanical and chemical processes that separate the fibers from the wood matrix. Paperboard can include, but is not limited to, semi-chemical paperboard, linerboards, containerboards, corrugated medium, folding boxboard, and cartonboards.

Paper may refer to a paper product such as dry paper board, fine paper, towel, tissue, and newsprint products. Dry paper board applications include liner, corrugated medium, bleached, and unbleached dry paper board.

Paper can include carton board, container board, and special board/paper. Paper can include boxboard, folding boxboard, unbleached kraft board, recycled board, food packaging board, white lined chipboard, solid bleached board, solid unbleached board, liquid paper board, linerboard, corrugated board, core board, wallpaper base, plaster board, book bindery board, woodpulp board, sack board, coated board, and the like.

"Pulp" refers to a fibrous cellulosic material. Suitable fibers for the production of the pulps are all conventional grades, for example mechanical pulp, bleached and unbleached chemical pulp, recycled pulp, and paper stocks obtained from all annuals. Mechanical pulp includes, for example, groundwood, thermomechanical pulp (TMP), chemothermochemical pulp (CTMP), groundwood pulp produced by pressurized grinding, semi-chemical pulp, high-yield chemical pulp and refiner mechanical pulp (RMP). Examples of suitable chemical pulps are sulfate, sulfite, and soda pulps. The unbleached chemical pulps, which are also referred to as unbleached kraft pulp, can be particularly used.

"Pulp slurry" refers to a mixture of pulp and water. The pulp slurry is prepared in practice using water, which can be partially or completely recycled from the paper machine. It can be either treated or untreated white water or a mixture of such water qualities. The pulp slurry may contain interfering substances (e.g., fillers). The filler content of paper may be up to about 40% by weight. Suitable fillers are, for example, clay, kaolin, natural and precipitated chalk, titanium dioxide, talc, calcium sulfate, barium sulfate, alumina, satin white or mixtures of the stated fillers.

"Papermaking process" is a method of making paper products from pulp comprising, inter alia, forming an aqueous pulp slurry, draining the pulp slurry to form a sheet, and drying the sheet. The steps of forming the papermaking furnish, draining and drying may be carried out in any conventional manner generally known to those skilled in the art.

Discussion

The various exemplary embodiments described herein include compositions that can be used in a paper material, and methods for adding the compositions to a paper material. The compositions can be used, for example, as a strength additive for paper. In an embodiment, a composition includes an anionic polymer, a polyamidoamine epihalohydrin (PAE) resin, and a stabilizer.

In an exemplary method, an anionic polymer may be mixed with a PAE resin and a stabilizer to form a composition, which is then added to a pulp slurry. In comparison, when using conventional strength additives that include a PAE resin, typically an anionic polymer is separately added to the pulp slurry after the PAE resin is mixed with other components in the pulp slurry. The exemplary composition and method provides synergistic effects in strength development of the resulting paper web as compared to sequential additions of conventional PAE resins and anionic polymers at equal total resin dosage. In addition, cost and complexity of processing may be reduced by eliminating the separate addition of anionic polymer.

The exemplary composition is a wet strength agent in certain conditions and can provide improved wet strength performance. The exemplary compositions have comparable azetidinium content and a comparable total level of epihalohydrin and byproducts (AOX) relative to other commercially available strength additives. In addition, the exemplary compositions may reduce the net cationic charge of the PAE resin, which can boost the wet strength resin machine retention and allow machines to continually load wet strength resins to achieve higher absolute wet strength without overcharging the wet end system. In addition, exemplary compositions can have a long stable shelf life.

Exemplary compositions can be used in towel or recycled towel grade applications, such as to optimize a CMC and PAE resin combination or to replace the CMC. In various embodiments, use of the exemplary composition can reduce the amount of resin needed, and lower the total resin costs.

An exemplary composition may include any suitable polyamidoamine epihalohydrin resin. For example, a polyamidoamine epihalohydrin resin may be prepared by reacting one or more polyalkylene polyamines and one or more a polycarboxylic acid and/or a polycarboxylic acid derivative compounds to form a polyamidoamine and then reacting the polyamidoamine with epihalohydrin to form the polyamidoamine epihalohydrin resin. The reactants may be heated to an elevated temperature, for example about 125 to 200° C. The reactants may be allowed to react for a predetermined time, for example about 1 to 10 hours. During the reaction, condensation water may be collected. The reaction may be allowed to proceed until the theoretical amount of water distillate is collected from the reaction. In an exemplary embodiment, the reaction may be conducted at atmospheric pressure.

In various embodiments, the polyamidoamine epihalohydrin resin and the preparation of the polyamidoamine epihalohydrin resin may be as described in one or more of U.S. Pat. Nos. 2,926,116, 2,926,154, 3,197,427, 3,442,754, 3,311,594, 5,171,795, 5,614,597, 5,017,642, 5,019,606, 7,081,512, 7,175,740, 5,256,727, 5,510,004, 5,516,885, 6,554,961, 5,972,691, 6,342,580, and 7,932,349, and U.S. Published Patent Application 2008/0255320, each of which is incorporated herein by reference, where the polyamidoamine epihalohydrin resin functions and has the characteristics (e.g., total AOX level, azetidinium content, etc.) described herein, and the mixture produced using the polyamidoamine epihalohydrin resin functions and has the characteristics described herein.

An exemplary polyamine can include an ammonium, an aliphatic amine, an aromatic amine, or a polyalkylene polyamine. A polyalkylene polyamine can include a polyethylene polyamine, a polypropylene polyamine, a polybutylene polyamine, a polypentylene polyamine, a polyhexylene polyamine, or a mixture thereof. A polyamine can include ethylene diamine (EDA), diethylenetriamine (DETA), triethylenetetramine (TETA), tetraethylenepentamine (TEPA), dipropylenetriamine (DPTA), bis-hexamethylenetriamine (BHMT), N-methylbis(aminopropyl)amine (MBAPA), aminoethyl-piperazine (AEP), pentaetehylenehexamine (PEHA), or a mixture thereof.

In some embodiments, the reaction may proceed under a reduced pressure. Where a reduced pressure is employed, a lower temperature of about 75° C. to 180° C. may be utilized. At the end of this reaction, the resulting product may be dissolved in water at a concentration of about 20 to 90% by weight total polymer solids, or about 30 to 80% by weight total polymer solids, or about 40 to 70% by weight total polymer solids. In the preparation of the polyamidoamines, the molar ratio of the polyamine to the polycarboxylic acid and/or polycarboxylic acid derivative can be about 1.05 to 2.0.

An exemplary polycarboxylic acid and/or polycarboxylic acid derivatives thereof (e.g., an ester of the polycarboxylic acid, an acid halide of the polycarboxylic acid, an acid anhydride of the polycarboxylic acid, and the like) can include malonic acid, glutaric acid, adipic acid, azelaic acid, citric acid, tricarballylic acid (1,2,3-propanetricarboxylic acid), 1,2,3,4-butanetetracarboxylic acid, nitrilotriacetic acid, N,N,N',N'-ethylenediaminetetraacetate, 1,2-cyclohexanedicarboxylic acid, 1,3-cyclohexanedicarboxylic acid, 1,4-cyclohexanedicarboxylic acid, phthalic acid, isophthalic acid, terephthalic acid, 1,2,4-benzenetricarboxylic acid (trimellitic acid), 1,2,4,5-benzenetetracarboxylic acid (pyromellitic acid), a carboxylate ester of any of these, an acid halide of any of these, an acid anhydride of any of these, or a mixture thereof.

An exemplary ester of polycarboxylic acids can include dimethyl adipate, dimethyl malonate, diethyl malonate, dimethyl succinate, dimethyl glutarate and diethyl glutarate. An exemplary acid anhydride can include succinic anhydride, maleic anhydride, N,N,N',N'-ethylenediaminetetraacetate dianhydride, phthalic anhydride, mellitic anhydride, pyromellitic anhydride, or a mixture thereof. An exemplary acid halide can include adipoyl chloride, glutaryl chloride, sebacoyl chloride, or a mixture thereof.

An exemplary polyamidoamine can have a molar ratio of polyalkylene polyamine to dicarboxylic acid of about 2:1 to 0.5:1, about 1.8:1 to 0.75:1, or about 1.6:1 to 0.85:1.

An exemplary polyamidoamine resin can have a reduced specific viscosity of about 0.02 dL/g to 0.25 dL/g, about 0.04 dL/g to 0.20 dL/g, or about 0.06 dL/g to 0.18 dL/g. Reduced specific viscosity (RSV) can be measured using a glass capillary viscometer at 30° C. The efflux time of each sample can be determined three times and the average efflux time calculated. The RSV can be calculated using the following formula (1):

$$RSV=((t-t_0))/t_0 c \quad (1)$$

where t is the average efflux time of the polyamidoamine sample diluted with 1 M NaCl solution, $t_0$ is the average efflux time of 1 M NaCl solution, c is the concentration of the diluted polyamidoamine sample, which is 5 g/dL.

An exemplary epihalohydrin can be a difunctional crosslinker that is used to prepare the polyamidoamine epihalohydrin resin. An exemplary epihalohydrin can include epichlorohydrin, epifluorohydrin, epibromohydrin, or epiiodohydrin, alkyl-substituted epihalohydrins, or a mixture thereof. An exemplary difunctional crosslinker for preparing the polyamidoamine epihalohydrin resin is epichlorohydrin.

In an exemplary embodiment, the polyamidoamine epihalohydrin resin has an epihalohydrin:amine (also expressed herein as "epi:amine" or "E:N") ratio of from about 0.2:1 to 1.45:1, from about 0.5:1 to 1.25:1, or from about 0.75:1 to 1:1. In exemplary embodiments, the E:N ratio may be greater than about 0.95:1 or about 0.95 to 1.25:1. The epi:amine ratio is calculated as the molar ratio of epichlorohydrin to amine content.

As mentioned above, the polyamidoamine epihalohydrin resin can be prepared by reacting epichlorohydrin with polyamidoamine. During the first step of the polyamidoamine epihalohydrin resin synthesis, epichlorohydrin reacts with polyamidoamine and forms amino-chlorohydrin. During the second step of the reaction, amino-chlorohydrin is converted azetidinium. In an exemplary embodiment, the azetidinium content can be controlled by one or more of the following: selection of the polyamidoamine backbone; the percent solids content of the resin; ratio of the components to form the polyamidoamine epihalohydrin resin; the epihalohydrin:amine ratio; the time frame; temperature, and/or the pH of the reaction; addition of components; and the like. In an embodiment, all or a substantial portion of the epichlorohydrin can be reacted with the amine groups to functionalize the polymer. The amount of epichlorohydrin that remains in the aqueous solution to react with water or chlorine to form byproducts can be reduced or eliminated as compared to when other commercially available components are used.

In an exemplary composition, the backbone of the polyamidoamine epihalohydrin resin may have a molecular weight of from about 2 to 50 kDa, from about 10 to about 30 kDa, or from about 15 to about 20 kDa.

In an embodiment, the polyamidoamine epihalohydrin resin can have a molecular weight of from about 10 to 1,000 kDa, from about 200 to 500 kDa, from about 200 to 250 kDa, or from about 250 to 300 kDa.

In an exemplary embodiment, the anionic polymer can include a polymer or co-polymer formed from one or more monomers having vinyl and/or allyl functionality. In an embodiment, the monomers may contain a carboxyl, phosphonate, sulfonate, or other anionically charged group, or the corresponding alkali metal alkaline earth metal or ammonium salt of such monomer.

In an exemplary embodiment, the anionic polymer can have a molecular weight of from about 50 to 1,500 kDa, from about 100 to 700 kDa, from about 200 to 600 kDa, or from about 300 to 500 kDa.

In an embodiment, the monomers to form the anionic polymer can include acrylic acid, methacrylic acid, acrylamidomethylpropanesulfonic acid, acryamidomethylbutanoic acid, maleic acid, fumaric acid, itaconic acid, vinyl sulfonic acid, styrene sulfonic acid, vinyl phosphonic acid, allyl sulfonic acid, allyl phosphonic acid, sulfomethylated acrylamide, phosphonomethylated acrylamide, water soluble alkali metal, alkaline earth metal, or ammonium salts thereof, and/or combinations of these. In an embodiment, the monomer to form the anionic polymer can include acrylic acid, or its alkali metal or ammonium salts.

In an exemplary embodiment, the composition includes an anionic polymer. An exemplary anionic polymer is an acrylic acid polymer or co-polymer (e.g., co-polymer of acrylic acid and acrylamide). In an embodiment, the anionic polymer can be a co-polymer that includes about 5 to 99.9% by weight of acrylic acid, while the remaining portion can be any one of the monomers mentioned above.

In an exemplary embodiment, the composition includes a stabilizer. An exemplary stabilizer can include at least one weak acid and at least one multivalent cation (or salt thereof). In an exemplary embodiment, the weak acid can include formic acid, acetic acid, benzoic acid, propionic acid, or the like, or a combination or mixture thereof. In an exemplary embodiment, the weak acid can be formic acid.

In an exemplary embodiment, the weak acid can be from about 50% to 99.9% by weight of the stabilizer (on a dry basis), or from about 70% to 90% by weight of the stabilizer.

In an exemplary embodiment, the multivalent cation can include calcium, aluminum, zinc, chromium, iron, magnesium, or lithium, or a combination or mixture thereof. In an embodiment, the multivalent cation can be calcium. In an embodiment, the multivalent cation can be present in a salt such as nitrates, sulfates, chlorides or bromides, of any of the cations mentioned herein. In an embodiment, the multivalent cation salt can be calcium chloride. In an exemplary embodiment, the stabilizer includes a multivalent cation salt, which can be from about 0.001% to 1% by weight of the stabilizer (on a dry basis), or from about 0.01 to 0.02% by weight of the stabilizer.

In an exemplary embodiment, the amount of the anionic polymer, polyamidoamine epihalohydrin, and/or stabilizer in the composition can be any amount as necessary or desired. In an exemplary embodiment, the ratio of the anionic polymer:polyamidoamine epihalohydrin in the composition can be from about 0.05:1 to 0.5:1, from about 0.15:1 to 0.5:1, or from about 0.05:1 to 0.15:1.

In an exemplary embodiment, the composition may contain from about 0.01% to 5% by weight stabilizer, based on the total weight of the composition, or from about 1% to 1.5% stabilizer.

In various embodiments, the composition may further include one or more additives, as necessary or desired. The additives may be combined with the composition before, simultaneously, or after introduction to the paper material. One having ordinary skill in the art would recognize which additives may be combined with the composition to provide a necessary or desired result.

In some embodiments, a method of applying the exemplary composition includes adding the composition directly to a pulp slurry, a fibrous web, individual fibers, or a paper material. For example, the composition can be applied as an aqueous solution to a cellulosic web, fibrous slurry, or individual fibers. Alternatively, the composition may be applied in the form of a suspension, a slurry, or as a dry reagent depending upon the particular application. Subsequently, the pulp slurry can be made into a fibrous substrate and then into a paper product.

By way of example only, application of the composition can be applied by any of the following methods or combinations thereof.

In an exemplary embodiment, the method can include direct addition of the composition to a fibrous slurry, such as by injection of the composition into a slurry prior to entry in the headbox.

In an exemplary embodiment, the method can include spraying the composition onto a fibrous web. For example, spray nozzles may be mounted over a moving paper web to apply a desired dose of a solution to a web that can be moist or substantially dry.

In an exemplary embodiment, the method can include application of the composition by spray or other means to a moving belt or fabric, which in turn contacts the tissue web to apply the chemical to the web, such as is disclosed in WO 01/49937.

In an exemplary embodiment, the method can include printing the composition onto a web, such as by offset printing, gravure printing, flexographic printing, ink jet printing, digital printing of any kind, and the like.

In an exemplary embodiment, the method can include coating the composition onto one or both surfaces of a web, such as blade coating, air knife coating, short dwell coating, cast coating, and the like.

In an exemplary embodiment, the method can include extrusion from a die head of the composition in the form of a solution, a dispersion or emulsion, or a viscous mixture.

In an exemplary embodiment, the method can include application of the composition to individualized fibers. For example, comminuted or flash dried fibers may be entrained in an air stream combined with an aerosol or spray of the composition to treat individual fibers prior to incorporation into a web or other fibrous product.

In an exemplary embodiment, the method can include impregnation of a wet or dry web with a solution or slurry of the composition, where the composition penetrates a significant distance into the thickness of the web, such as about 20% or more of the thickness of the web, about 30% or more of the thickness of the web, or about 70% or more of the thickness of the web, including completely penetrating the web throughout the full extent of its thickness.

In an embodiment, the method for impregnation of a moist web can include the use of the Hydra-Sizer® system, produced by Black Clawson Corp., Watertown, N.Y., as described in "New Technology to Apply Starch and Other Additives," Pulp and Paper Canada, 100(2): T42-T44 (February 1999). This system includes a die, an adjustable support structure, a catch pan, and an additive supply system. A thin curtain of descending liquid or slurry is created which contacts the moving web beneath it. Wide ranges of applied doses of the coating material are said to be achievable with good runnability. The system can also be applied to curtain coat a relatively dry web, such as a web just before or after creping.

In an exemplary embodiment, the method can include a foam application of the composition to a fibrous web (e.g., foam finishing), either for topical application or for impregnation of the additive into the web under the influence of a pressure differential (e.g., vacuum-assisted impregnation of the foam). Principles of foam application of additives such as binder agents are described in the following publications: F. Clifford, "Foam Finishing Technology: The Controlled Application of Chemicals to a Moving Substrate," *Textile Chemist and Colorist*, Vol. 10, No. 12, 1978, pages 37-40; C. W. Aurich, "Uniqueness in Foam Application," Proc. 1992 *Tappi Nonwovens Conference*, Tappi Press, Atlanta, Ga., 1992, pp. 15-19; W. Hartmann, "Application Techniques for Foam Dyeing & Finishing", *Canadian Textile Journal*, April 1980, p. 55; U.S. Pat. No. 4,297,860, and U.S. Pat. No. 4,773,110, each of which is herein incorporated by reference.

In an exemplary embodiment, the method can include padding of a solution containing the composition into an existing fibrous web.

In an exemplary embodiment, the method can include roller fluid feeding of a solution of the composition for application to the web.

When applied to the surface of a paper web, the exemplary composition can be applied to an embryonic web prior to Yankee drying or through drying, and/or optionally after final vacuum dewatering has been applied.

In an exemplary embodiment, the application level of the composition can be about 0.05% to about 10% by weight relative to the dry mass of the web for any of the paper strength system. In exemplary embodiment, the application level can be from about 0.01% to 50%, from about 0.05% to 4%, or from about 0.1% to 2%.

In an exemplary embodiment, when combined with the web or with cellulosic fibers (e.g., pulp slurry) the composition can have any appropriate pH for the selected system. In various embodiments, the composition may be in solution having a pH below about 10, about 9, about 8 or about 7, such as about 2 to about 8, about 2 to about 7, about 3 to about 6, or about 3 to about 5.5. Alternatively, the pH range may be about 5 to about 9, about 5.5 to about 8.5, or about 6 to about 8. These pH values can apply to the composition prior to contacting the web or fibers, or to a mixture of the composition and the pulp slurry or the web or the fibers prior to drying.

In an embodiment, the temperature of the pulp slurry can be about 10 to 80° C. when the composition is added to the pulp slurry. In an embodiment, the process variables may be modified as necessary or desired, including, for example, the temperature of composition and the concentration of the pulp slurry.

Ignoring the presence of chemical compounds other than the composition and focusing on the distribution of the composition in the web, one skilled in the art will recognize that the composition can be distributed in a wide variety of ways. For example, the composition may be uniformly distributed, or present in a pattern in the web, or selectively present on one surface or in one layer of a multilayered web. In multi-layered webs, the entire thickness of the paper web may be subjected to application of the composition and other chemical treatments described herein, or each individual layer may be independently treated or untreated with the composition and other chemical treatments of the present disclosure. In an exemplary embodiment, the composition is predominantly applied to one layer in a multilayer web. Alternatively, at least one layer is treated with significantly less composition than other layers. For example, an inner layer can serve as a treated layer with increased wet strength or other properties.

In an exemplary embodiment, the composition may also be selectively associated with one of a plurality of fiber types, and may be adsorbed or chemisorbed onto the surface of one or more fiber types. For example, bleached kraft fibers can have a higher affinity for the composition than synthetic fibers that may be present.

In an exemplary embodiment, certain chemical distributions may occur in webs that are pattern densified, such as the webs disclosed in any of the following U.S. Pat. Nos. 4,514,345; 4,528,239; 5,098,522; 5,260,171; 5,275,700; 5,328,565; 5,334,289; 5,431,786; 5,496,624; 5,500,277; 5,514,523; 5,554,467; 5,566,724; 5,624,790; and 5,628,876, the disclosures of which are incorporated herein by reference to the extent that they are non-contradictory herewith.

In an exemplary embodiment, the composition, or other chemicals can be selectively concentrated in the densified regions of the web (e.g., a densified network corresponding to regions of the web compressed by an imprinting fabric pressing the web against a Yankee dryer, where the densified network can provide good tensile strength to the three-dimensional web). This is particularly so when the densified regions have been imprinted against a hot dryer surface while the web is still wet enough to permit migration of liquid between the fibers to occur by means of capillary forces when a portion of the web is dried. In this case, migration of the aqueous solution composition can move the composition toward the densified regions experiencing the most rapid drying or highest levels of heat transfer.

The principle of chemical migration at a microscopic level during drying is well attested in the literature. See, for example, A. C. Dreshfield, "The Drying of Paper," *Tappi Journal*, Vol. 39, No. 7, 1956, pages 449-455; A. A. Robertson, "The Physical Properties of Wet Webs. Part I," *Tappi Journal*, Vol. 42, No. 12, 1959, pages 969-978; U.S. Pat. No. 5,336,373, and U.S. Pat. No. 6,210,528, each of which is herein incorporated by reference.

Without wishing to be bound by theory, it is believed that chemical migration may occur during drying when the initial solids content (dryness level) of the web is below about 60% (e.g., less than any of about 65%, about 63%, about 60%, about 55%, about 50%, about 45%, about 40%, about 35%, about 30%, and about 27%, such as about 30% to 60%, or about 40% to about 60%). The degree of chemical migration can depend, for example, on the surface chemistry of the fibers, the chemicals involved, the details of drying, the structure of the web, and so forth. On the other hand, if the web with a solid contents below about 60% is through-dried to a high dryness level, such as at least any of about 60% solids, about 70% solids, and about 80% solids (e.g., from 65% solids to 99% solids, or from 70% solids to 87% solids), then regions of the web disposed above the deflection conduits (i.e., the bulky "domes" of the pattern-densified web) may have a higher concentration of composition, or other water-soluble chemicals than the densified regions, for drying will tend to occur first in the regions of the web through which air can readily pass, and capillary wicking can bring fluid from adjacent portions of the web to the regions where drying is occurring most rapidly. In short, depending on how drying is carried out, water-soluble reagents may be present at a relatively higher concentration (compared to other portions of the web) in the densified regions or the less densified regions ("domes").

The composition may also be present substantially uniformly in the web, or at least without a selective concentration in either the densified or undensified regions.

According to an exemplary method, the conditions (e.g., temperature of the pulp slurry, temperature of composition, concentration of the composition, co-mixing of solids, and the like) of the pulp slurry and process can vary, as necessary or desired, depending on the particular paper product to be formed, characteristics of the paper product formed, and the like. In an embodiment, the temperature of the pulp slurry can be about 10 to 80° C. when the composition is added to the pulp slurry. In an embodiment, the process variables may be modified as necessary or desired, including, for example, the temperature of composition and the concentration of the pulp slurry.

In various exemplary embodiments a paper may be formed by the treatment of a cellulosic fiber or an aqueous pulp slurry with a composition as described herein. The paper can be formed using one or more methods, including those described herein.

In an exemplary embodiment, the resultant paper has improved dry and temporary wet strength performance characteristics relative to paper produced using commercially-available PAE.

Test Methods:

Dry Tensile Test

Tensile strength is measured by applying a constant-rate-of-elongation to a sample and recording three tensile breaking properties of paper and paper board: the force per unit width required to break a specimen (tensile strength), the percentage elongation at break (stretch) and the energy absorbed per unit area of the specimen before breaking (tensile energy absorption). This method is applicable to all types of paper, but not to corrugated board. This procedure references TAPPI Test Method T494 (2001), which is incorporated herein by reference, and modified as described.

Initial Wet Tensile Test

This test method is used to determine the initial wet tensile strength of paper and paperboard after contacting with water for 2 seconds. The 1" wide paper strip is placed in the tensile testing machine and wetted for both strip sides with distilled water by a paint brush. After the contact time of 2 seconds, the strip is broken as required in 6.8-6.10 of TAPPI Test Method 494(2001). The initial wet tensile is useful in the evaluation of the performance characteristics of tissue products, paper towels and other papers subjected to stress during processing or use while instantly wet. This method references TAPPI Test Method T456 (2005), which is incorporated herein by reference, and modified as described.

EXAMPLES

Now having described the embodiments, in general, the examples describe some additional embodiments. While embodiments are described in connection with the examples and the corresponding text and figures, there is no intent to limit embodiments of the disclosure to these descriptions. On the contrary, the intent is to cover all alternatives, modifications, and equivalents included within the spirit and scope of exemplary embodiments.

Example 1

In this example, the stability and strength characteristics were measured for several strength compositions. To prepare sample compositions 1-4 a polyamidoamine polymer with 60% solids was diluted to 22.5% by weight content with water, and then reacted with epichlorohydrin at 125 mole % of amine until the resulting polyamidoamine epichlorohydrin resin reaches the viscosity of about 80-85 cps (LVT viscometer at 55 ° C.). A blend of formic acid and sulphuric acid at the weight blend ratio of 1.4 was used to quench the polymerization reaction by lowering the batch pH to 3.0. The solution was then diluted with water to 20% by weight solids. The solution was post added to 10 wt % a polyacrylamide co-acrylic acid (5-30% solids and average molecular weight of 100,000 to 400,000 Da). To the blended polymer mixture was then added the stabilizer (CaCl$_2$) composition specified in Table 1. The composition was finally adjusted to a pH of 2.7 using the acid specified in Table 1. The mixture was finally adjusted to 20% solids.

The sample compositions were stored for several days at 25° C. and at an elevated temperature of 35° C., and the stability was observed. Table 1 shows the stability of the sample compositions over the test period. The sample compositions were added to a handsheet, and strength characteristics were observed. The strength characteristics are summarized in Table 1, below.

TABLE 1

Stability and Strength Characteristics for Strength Compositions

| Sample # | Acid Type (Used to adjust new blend resins to pH 2.7) | Percent CaCl$_2$ added | Initial Resin Viscosity (cPs) | Viscosity after 30 days aged at 25° C. | Days to Gel at 35° C. Storage | Wet Strength Performance |
|---|---|---|---|---|---|---|
| 1 | Sulfuric acid | 0.0% | 82 | gelled | 7 | Poor |
| 2 | Formic acid | 0.0% | 82 | 202 | 14 | Very good |
| 3 | Formic acid | 0.20% | 82 | 79 | >30 | Good |
| 4 | Formic acid | 0.40% | 82 | 81* | >60* | Good |

*note:
some CaCl$_2$ related white precipitate in Sample 4 occurred as the sample aged

Example 2

In this example, exemplary compositions were prepared at varied anionic polymer levels to observe the effect on strength and stability of the compositions. Sample compositions were prepared by combining the stabilizer of Sample 3 in Example 1 with various polymer compositions, as provided in Table 2.

To prepare the sample compositions, a polyamidoamine polymer with 60% solids was diluted to 22.5% by weight content with water, and then reacted with epichlorohydrin at 125 mole % of amine until the resulting polyamidoamine epichlorohydrin resin reaches the viscosity of about 80-85 cps (LVT viscometer at 55° C.). A blend of formic acid and sulphuric acid at the weight blend ratio of 1.4 was used to quench the polymerization reaction by lowering the batch pH to 3.0. The solution was then diluted with water to 20% by weight solids. The solution was post added to 10 wt % a polyacrylamide co-acrylic acid (20% solids and average molecular weight specified in Table 2). To the blended polymer mixture was then added 0.2 wt % of calcium chloride. The composition was finally adjusted to a pH of 2.7 using formic acid. The mixture was finally adjusted to 20% solids and yielded a viscosity range of about 90.8 cPs at 25° C. The sample compositions were stored for several days at an elevated temperature of 35° C., and the stability was observed (see Table 2, below).

Handsheets were prepared using a furnish of a 50/50 mixture of bleached hardwood and softwood kraft pulp refined to a Canadian Standard Freeness of 450 to which the stock pH was adjusted to 7.5. Deionized water was used for furnish preparation, and additional 150 ppm of sodium sulphate, 35 ppm of calcium chloride and 150 ppm bicarbonate were added. While mixing, a batch of 0.6% solids containing 8.7 g of cellulose fiber was treated with 10 lb/ton resin of one of the sample compositions, which were diluted to 1% wt. % with deionized water. After addition of the sample composition, the mixing/contact time was constant at 30 second. Then, three 2.9-g sheets of paper were formed using a standard (8"×8") Nobel & Woods handsheet mold, to target a basis weight of 50 lbs./3000 ft$^2$, pressed between felts in the nip of a pneumatic roll press at about 15 psig and dried on the rotary dryer at 230° F. The paper samples were oven cured for 10 minutes at the temperature of 110° C., then conditioned in the standard TAPPI control room for overnight.

For each treated handsheet, dry tensile and initial wet tensile measurements were performed, using the test methods described above. Table 2, below, shows the stability and strength characteristics for the handsheets treated with each of the sample compositions.

TABLE 2

Stability and Strength Characteristics for Strength Compositions

| Sample # | Blend Wt. Ratio of PAE/Anionic Polymer | Wt % acrylic acid in anionic co-polymer | Anionic polymer Average Mw Dalton | Days to Gel at 35° C. Storage | 10 lb/ton Wet strength Dosed Handsheet Strength Performance | |
|---|---|---|---|---|---|---|
| | | | | | Dry Tensile lb/inch | Initial Wet Tensile lb/inch |
| 5 | 90/10 | 8 | 340,000 | 30 | 22.59 | 5.09 |
| 6 | 90/10 | 8 | 171,000 | 45 | 20.21 | 4.13 |
| 7 | 90/10 | 30 | 330,000 | Formed macroscopic particles which rapidly sedimented out from mixture polymer solution | | |
| 8 | 90/10 | 30 | 125,000 | 35 | 20.04 | 3.96 |

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

It should be emphasized that the above-described embodiments are merely possible examples of implementations, and are merely set forth for a clear understanding of the principles of this disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

We claim at least the following:

1. A strength additive composition for paper, the composition comprising:
   water;
   a polymeric component consisting of an anionic polymer and a polyamidoamine epihalohydrin; and
   a stabilizer consisting of a multivalent cation and a weak acid, sulfuric acid or both.

2. The composition of claim 1, wherein the anionic polymer has a molecular weight of about 100 to 700 kDa.

3. The composition of claim 1, wherein the polyamidoamine epihalohydrin resin has an epihalohydrin:amine mole ratio of greater than about 0.96:1.

4. The composition of claim 1, wherein the ratio of the anionic polymer and polyamidoamine epihalohydrin resin is about 0.05 to 1.

5. The composition of claim 1, wherein the anionic polymer is formed from a monomer selected from the group consisting of: acrylic acid, methacrylic acid, acrylamidomethylpropanesulfonic acid, acryamidomethylbutanoic acid, maleic acid, fumaric acid, itaconic acid, vinyl sulfonic acid, styrene sulfonic acid, vinyl phosphonic acid, allyl sulfonic acid, allyl phosphonic acid, sulfomethylated acrylamide, phosphonomethylated acrylamide, water soluble alkali metal salt of each of these, alkaline earth metal salt of each of these, and ammonium salt of each of these, and a combination of these.

6. The composition of claim 1, wherein anionic polymer is selected from the group consisting of: polyacrylamide, co-polymer of acrylic acid, and a combination thereof.

7. The composition of claim 1, wherein the multivalent cation is selected from the group consisting of: calcium, aluminum, zinc, chromium, iron, magnesium, lithium, and a combination thereof.

8. The composition of claim 1, wherein the weak acid is selected from the group consisting of: formic acid, acetic acid, benzoic acid, propionic acid, and a combination thereof.

9. The composition of claim 1, wherein the multivalent cation is calcium and weak acid is formic acid.

10. The composition of claim 1, wherein the polyamidoamine epihalohydrin resin is a polyamidoamine epichlorohydrin resin.

11. The composition of claim 1, wherein the polyamidoamine epihalohydrin resin has a molecular weight of about 100 to 400 kDa.

12. The composition of claim 1, wherein the composition comprises about 1% to about 1.5% stabilizer by weight.

13. A method of improving the strength of a paper when making the paper, the method comprising:
   introducing to an aqueous pulp slurry a strength additive composition as a mixture, wherein the composition includes water, a polymeric component consisting of an anionic polymer and a polyamidoamine epihalohydrin resin, and a stabilizer consisting of a multivalent cation and a weak acid, sulfuric acid or both.

14. The method of claim 13, wherein the paper is a paper product that is selected from the group consisting of: a dry paper board, a fine paper, a towel, a tissue, and a newsprint product.

15. The method of claim 13, wherein the anionic polymer is formed from a monomer selected from the group consisting of: acrylic acid, methacrylic acid, acrylamidomethylpropanesulfonic acid, acryamidomethylbutanoic acid, maleic acid, fumaric acid, itaconic acid, vinyl sulfonic acid, styrene sulfonic acid, vinyl phosphonic acid, allyl sulfonic acid, allyl phosphonic acid, sulfomethylated acrylamide, phosphonomethylated acrylamide, water soluble alkali metal salt of each of these, alkaline earth metal salt of each of these, and ammonium salt of each of these, and a combination of these.

16. The method of claim 13, wherein anionic polymer is selected from the group consisting of: polyacrylamide, co-polymer of acrylic acid, and a combination thereof.

17. The method of claim 16, wherein the multivalent cation is selected from the group consisting of: calcium, aluminum, zinc, chromium, iron, magnesium, lithium, and a combination thereof.

18. The method of claim 17, wherein the weak acid is selected from the group consisting of: formic acid, acetic acid, benzoic acid, propionic acid, and a combination thereof.

19. The method of claim 13, wherein the multivalent cation is calcium and weak acid is formic acid.

* * * * *